(12) United States Patent
Nakamichi

(10) Patent No.: US 6,643,250 B1
(45) Date of Patent: *Nov. 4, 2003

(54) DISK PLAYBACK DEVICE

(75) Inventor: Niro Nakamichi, Tokyo (JP)

(73) Assignee: Nakamichi Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,961

(22) Filed: Sep. 29, 1998

(30) Foreign Application Priority Data

Oct. 1, 1997 (JP) .............................. 9-284694

(51) Int. Cl.[7] .............................................. G11B 23/00
(52) U.S. Cl. ..................................................... 369/263
(58) Field of Search ................................ 369/247, 263, 369/75.1, 75.2, 77.1, 77.2

(56) References Cited

U.S. PATENT DOCUMENTS 5,347,507 A * 9/1994 Kuhn .......................... 369/263
5,768,249 A * 6/1998 Ro et al. ..................... 369/263
5,956,314 A * 9/1999 Ishimatsu et al. ........... 369/247

FOREIGN PATENT DOCUMENTS

| JP | 189645 | 6/1989 |
| JP | 718079 | 4/1995 |
| JP | 795385 | 10/1995 |

* cited by examiner

*Primary Examiner*—Glenton B. Burgess
*Assistant Examiner*—Tod Kupstas
(74) *Attorney, Agent, or Firm*—Darby & Darby

(57) ABSTRACT

Resilient members absorb vibrations to limit transmission of vibrations from a chassis to a base of a disk record/playback device. A restricting device limits transverse movement of the base on the resilient members. The restricting device limits sloping of a disk mounted on the record/playback device, and thereby prevents interference of the mounted disk with other disks in a storage device. By minimizing the sloping of the disk, the minimum required clearance from the disk mounted on the turntable is reduced and the available vertical space for use in storing disks is maximized. A compact design is possible permitting conformity to constrained dimensions such as standard DIN dimensions in vehicles.

14 Claims, 9 Drawing Sheets

DISK PLAYBACK DEVICE

BACKGROUND OF THE INVENTION

The present invention relates to a disk playback device that elastically supports an optical mechanism using a vibration-preventing member.

Various kinds of changer-type disk playback devices (hereinafter referred to as changers) conforming to the DIN standard (ISO 7736) dashboard cavity size (182 mm wide, 53 mm high) for audio devices have been proposed.

Referring to FIGS. 4–6, a changer previously proposed by the present applicant includes a changer having an optical mechanism 10, a holder 20, and transferring means 22. These elements are disposed inside a chassis 25 conforming to the DIN standard dashboard cavity size. Disks held in a holder 20 can be selectively played back.

A base 3 serves as a base for optical mechanism 10. Optical mechanism 10 includes optical reading means such as a turntable 8 and an optical pickup 1. Base 3 is attached to a moving base 9 via vibration-preventing members 15. Moving base 9 is driven by a moving mechanism M1 to move between a playback position P1 shown in FIG. 4 and a recessed position P2 shown in FIG. 5. When moving base 9 is at playback position P1, moving mechanism M1 moves optical mechanism 10 up and down between an upper, mount position where a disk is mounted, and a lower recessed position. Holder 20 can hold a plurality of disks D coaxially and is moved along four vertical shafts 21. Holder 20 is driven by a moving mechanism M2 to transfer the stored disks to appropriate heights. Transferring means 22 drives the edges of a disk using a belt (not shown) to transfer the disk between an insertion/removal position Da, a playback position Dp, and a holding position Ds.

In the above described changer, a disk that is currently in a playback position being played back is transferred to a holding position while a selected disk is retrieved from another holding position and transferred to the playback position. The transfer is performed as follows:

(1) optical mechanism 10 is moved downward away from a disk in a disk playback position Dp;

(2) transferring means 22 moves the disk in the disk playback position Dp to a disk holding position Ds in a holder 20;

(3) optical mechanism 10 is moved back to the recessed position where there is no overlap with the stored disks;

(4) holder 20 is moved vertically to provide alignment with a selected disk;

(5) transferring means 22 moves the selected disk from disk holding position Ds in the holder 20 to the disk playback position Dp;

(6) optical mechanism 10 is transferred to a playback position (a disk mount position) where there is overlap with the stored disks;

(7) optical mechanism 10 is raised and the clamped disk is played back.

The detailed structures of the mechanism and operations performed can be found in Japanese Patent Application No. 9-105135 (U.S. patent application Ser. No. 09/057,209, Attorney Docket No. M1653-119), filed by the present applicant, the disclosure of which is hereby incorporated by reference.

In order to accommodate the DIN standard dashboard size, many design considerations must be contemplated. The above discussed changer was designed such that the optical mechanism 10 must be movable between a playback position that overlaps with the stored disks and a recessed position where there is no overlap. Since the changer requires these two positions of the optical mechanism 10, the size of the changer is determined roughly by (diameter of the disk)+(size of the optical mechanism). Although it is possible to make optical mechanism 10 more compact, the size of optical mechanism 10 is determined by the diameter of turntable 8 and the required range of motion for optical pickup 1. Thus, optical mechanism 10 often tends to be formed with a long shape parallel to the direction of motion of optical pickup 1.

When a changer is installed in a vehicle, external vibrations such as vibrations from the vehicle can lead to frequent read errors during playback of a disk. To prevent the external vibrations from causing read errors, it would be desirable to provide floating support of optical mechanism 10 to the chassis using vibration-preventing members such as dampers or coil springs.

Referring now to FIG. 7 and FIG. 8, vibration-preventing members 15 are disposed at the four corners of the optical mechanism 10. When a vibration affects the changer, the vibration-preventing members may compress or expand in unequal amounts. Along the long axis A1 of optical mechanism 10 a small slope S1 is formed between the base 3 and the moving base 9 due to such external vibration. However, along the short axis A2 of optical mechanism 10 a large slope S2 is formed between the base 3 and the moving base 9. The large spacing of the vibration-preventing members 15 along the long axis A1 and the close spacing along the short axis A2 accounts for the difference in the respective slopes.

As a consequence of the large slope S2, the dimensions of the changer must be altered. It is possible that a vibration may cause contact between the playback disk and the stored disk resulting from the slope S2 along the short axis A2 of optical mechanism 10. The clearance between the playback disk and the stored disks (shown as L1 and l2 in FIG. 6) must be increased to account for slope S2. Similarly, the number of disks stored in the changer must be reduced to prevent damaging the disks.

OBJECTS AND SUMMARY OF THE INVENTION

Accordingly, it is an object of the invention to provide a disk playback device which overcomes the drawbacks of the prior art. In particular, an object of the invention is to provide a compact size disk changer with improved stability of operation.

It is a further object of the invention to provide a disk playback device capable of being mounted in a standard DIN dimension dashboard cavity.

It is another object of the invention to provide a disk playback device of a reduced overall size.

It is a still further object of the invention to provide an improved disk playback device which dampens the effect of vibrations to enhance the quality of data recovery from a disk.

It is yet another object of the present invention is to provide a disk playback device which does not damage surfaces of disks while damping the effect of external vibrations on the disk.

It is a further object of the present invention to provide a disk playback device which prevents contact between disks stored in a holder and a disk in a playback position.

It is still a further object of the present invention to provide a disk playback device which reduces the effects of external vibrations on a disk in a playback position by supporting the disk on a vibrationally damped member.

It is another object of the present invention to provide a disk playback device which reduces the effects of vibrations on a disk being read by an optical mechanism and prevents contact between the disk and stored disks in a holder by supporting the disk with a vibrationally damped member which elastically restricts sloping of the optical mechanism in a direction effected by the vibrations.

Briefly stated, the present invention provides that resilient members absorb vibrations to limit transmission of vibrations from a chassis to a base of a disk record/playback device. A restricting device limits transverse movement of the base on the resilient members. The restricting device limits sloping of a disk mounted on the record/playback device, and thereby prevents interference of the mounted disk with other disks in a storage device. By minimizing the sloping of the disk, the minimum required clearance from the disk mounted on the turntable is reduced and the available vertical space for use in storing disks is maximized. A compact design is possible permitting conformity to constrained dimensions such as standard DIN dimensions in vehicles.

In accordance with these and other objects of the invention, there is provided a disk playback device comprising: a turntable for mounting a disk thereon, an optical pickup movable along a radius of the disk for optically reading information recorded on the disk when the disk is mounted on the turntable, a base extending along a direction of motion of the optical pickup, the turntable and the optical pickup being disposed on the base, a vibration-preventing member elastically supporting the base, and restricting means restricting a sloping of the base along a short side of the base.

The present invention also provides a disk playback device comprising: a turntable for mounting a disk thereon, an optical pickup movable along a radius of the disk for optically reading information recorded on the disk when the disk is mounted on the turntable, a base extending along a direction of motion of the optical pickup, the turntable and the optical pickup being disposed on the base, a plurality of vibration-preventing members elastically supporting the base, and restricting means restricting a sloping of the base along a direction in which a distance between the vibration-preventing members is smaller.

According to a feature of the invention, there is further provided a disk playback device comprising: a turntable for mounting a disk thereon, an optical pickup movable along a radius of the disk for optically reading information recorded on the disk when the disk is mounted on the turntable, the turntable and the optical pickup being disposed on a base, the base extending along a direction of motion of the optical pickup, a vibration-preventing member elastically supporting the base, and restricting means providing elastic restriction of a sloping by the base along a first direction which is effected by an external vibration.

The present invention further includes a device comprising: a chassis, a base having a first axis and a second axis, the first axis being perpendicular to the second axis, the base extending along a direction of the first axis, a turntable for mounting a disk thereon, the turntable being disposed on the base, a vibration-preventing member resiliently supporting the base on the chassis to damp external vibrations and thereby reduce vibrations on the turntable, and restricting means elastically restricting a sloping oft he base along the second axis.

According to a still further feature of the invention, there is further provided a device comprising: a chassis, a base having a first axis and a second axis, the first axis being perpendicular to the second axis, a turntable for mounting a first disk thereon, the turntable being disposed on the base, a holder having a plurality of disks in a storage position, the holder being disposed on the chassis, a vibration-preventing member elastically supporting the base on the chassis such that an external vibration effecting the chassis is damped from the turntable, and restricting means elastically restricting a sloping of the base along one of the first axis and the second axis such that the restricting means prevents the external vibration from causing the first disk to contact the plurality of disks.

According to yet another feature oft he present invention, there is provided a device comprising: a chassis a base having a first axis and a second axis, the first axis being perpendicular to the second axis, a turntable for mounting a disk thereon, the turntable being disposed on the base, a holder having a plurality of disks in a storage position, the holder being disposed on the chassis, a vibration-preventing member elastically supporting the base on the chassis such that an external vibration effecting the chassis is damped from the turntable, restricting means elastically restricting a sloping of the base along one of the first axis and the second axis such that the restricting means prevents the external vibration from causing the first disk to contact the plurality of disks, an optical pickup movable along a radius of the first disk for reading optically recorded information from the first disk mounted on the turntable, the optical pickup is disposed on the base such that the vibration-preventing member reduces the effects of the external vibration on the reading of the first disk, a moving mechanism for moving the base between a mount position, where the first disk is mounted on the turntable, and a recessed position, where the turntable is recessed, and the restricting means includes guiding means allowing the moving mechanism to move the base.

According to another feature of the invention, there is further provided an apparatus for preventing distortion of an optical assembly comprising: the optical assembly being supported on a base, the base extending along a first direction, a plurality of resilient elements supporting the base, and reducing vibration transmission to the optical assembly, and at least one motion-restricting element restricting transverse movement of the base, whereby a sloping of the base along a second direction is reduced.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 6:
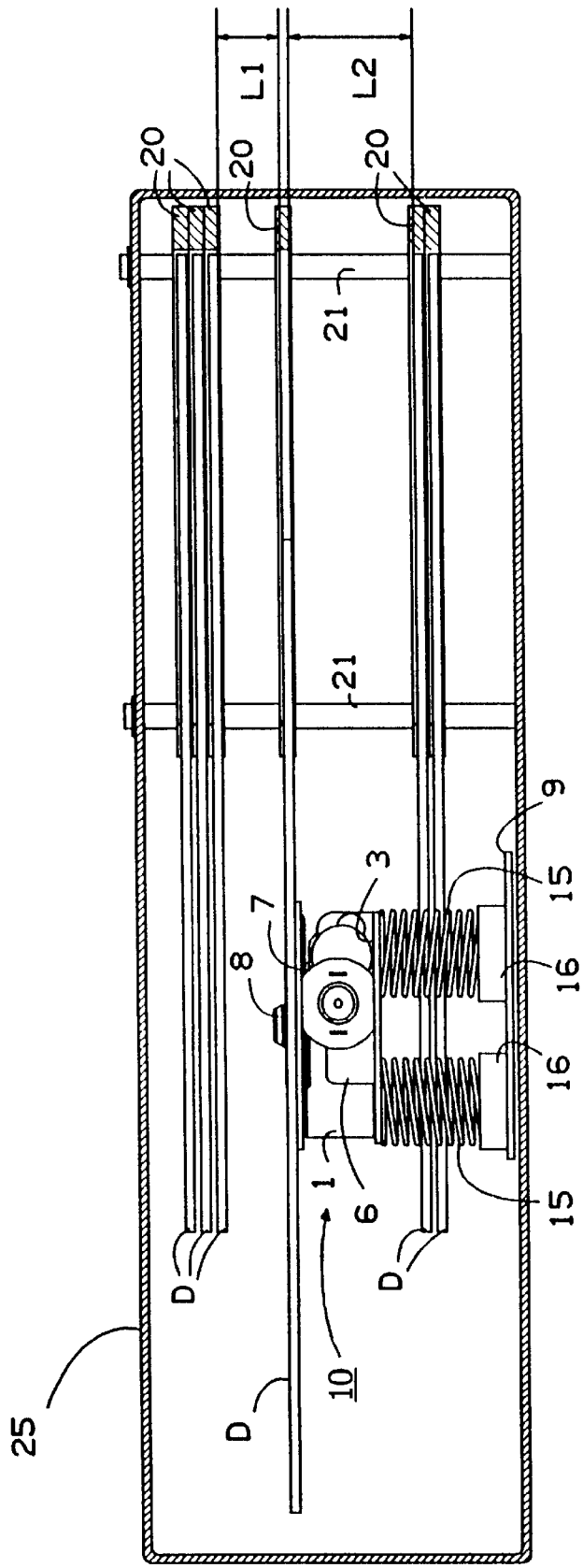
FIG. 6 is a side-view drawing of a conventional changer when the optical mechanism is brought to a playback position.
Figure 7:
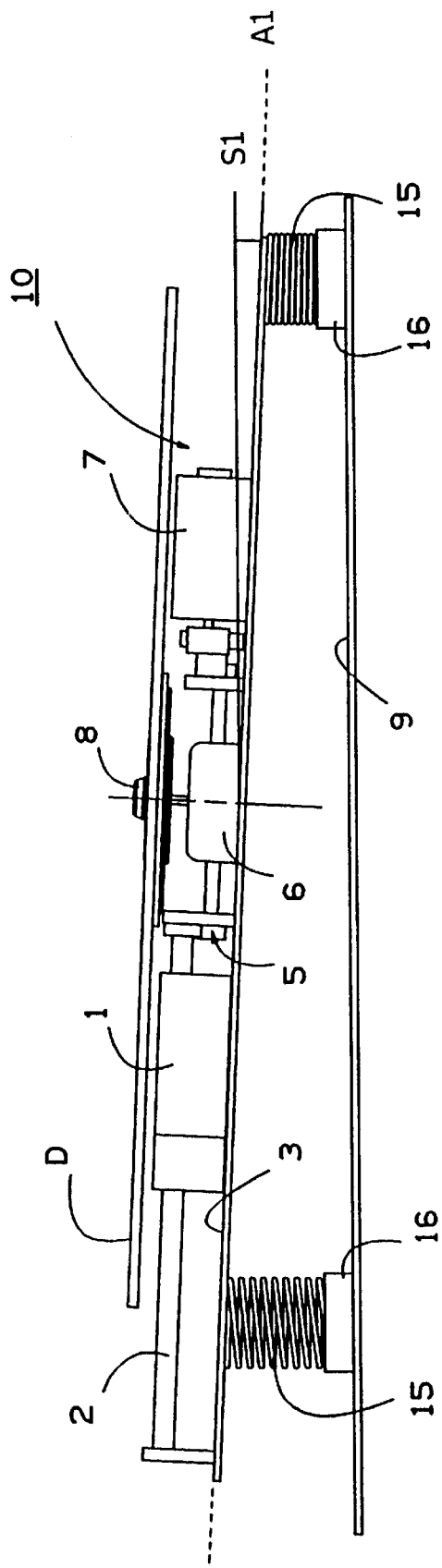
FIG. 7 is a drawing showing the optical mechanism inclined along its long side in a conventional changer.
Figure 8:
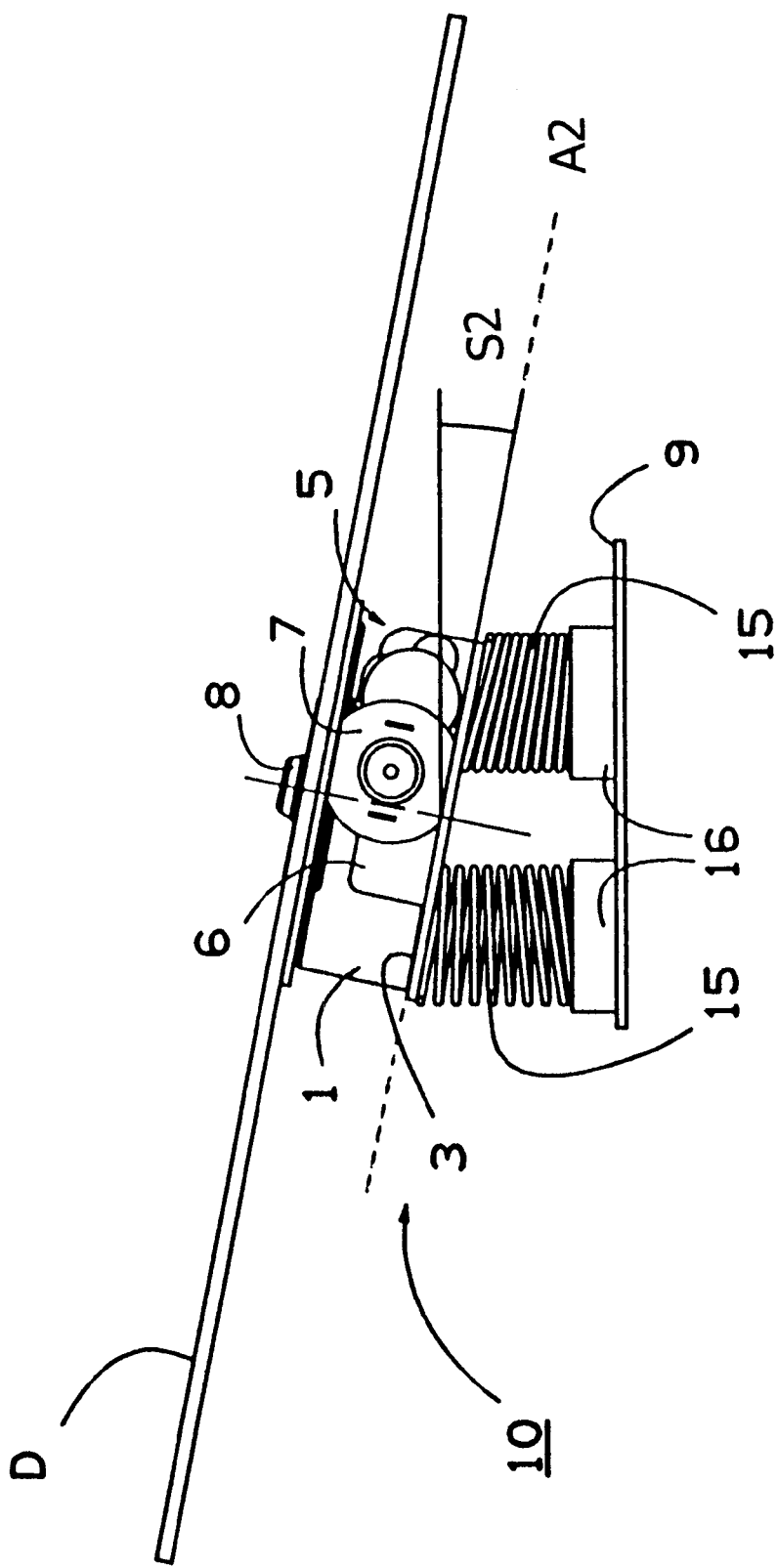
FIG. 8 is a drawing showing the optical mechanism inclined along its short side in a conventional changer.

Holder 20, transfer mechanisms M1, M2, and the like of the present invention employ the same elements as do the conventional device of FIGS. 6–8. Therefore drawings and detailed descriptions of these elements are omitted.

In order to overcome the problems of the conventional technology previously described above, the disk playback device according to the present invention provides means for elastically restricting the sloping of an optical mechanism for the direction in which external vibrations are most likely to have an effect. Thus, the sloping of the optical mechanism in one direction is reduced and the disk mounted on the turntable is prevented from contacting the stored disks and mechanisms around the disks.

Figure 1:
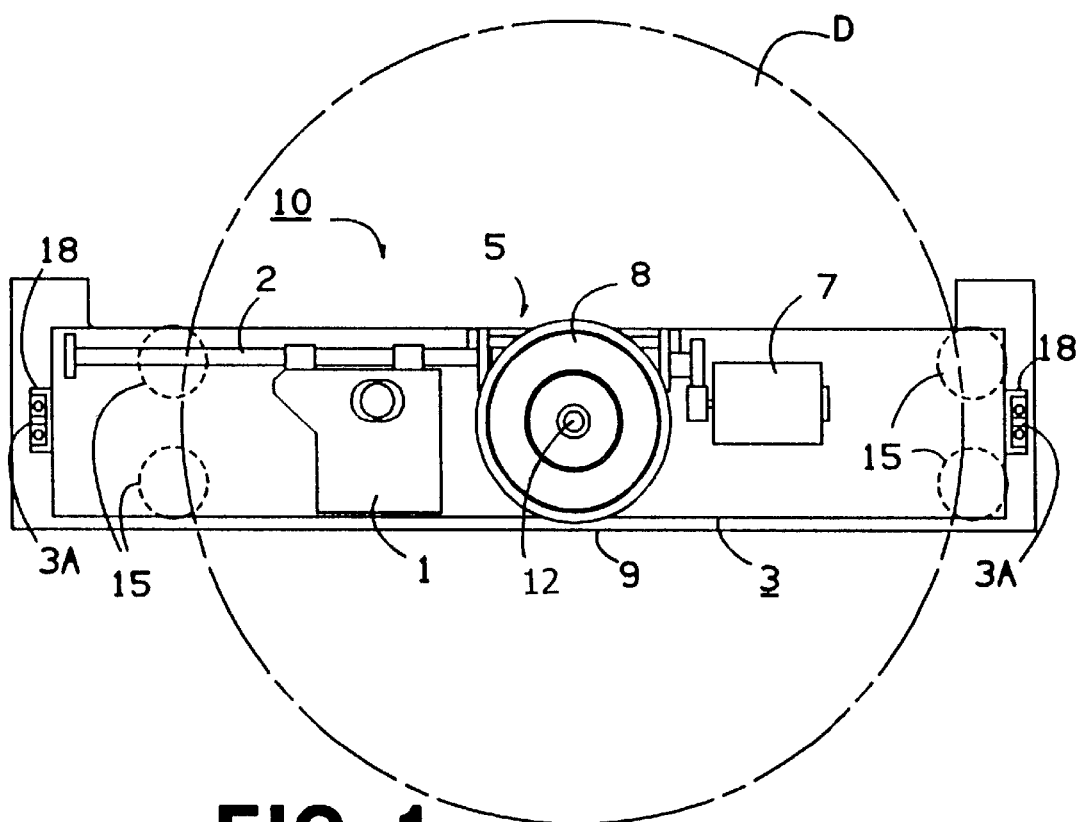
FIG. 1 is a plan drawing of an optical mechanism to which reference will be made in describing the invention.
Figure 2:
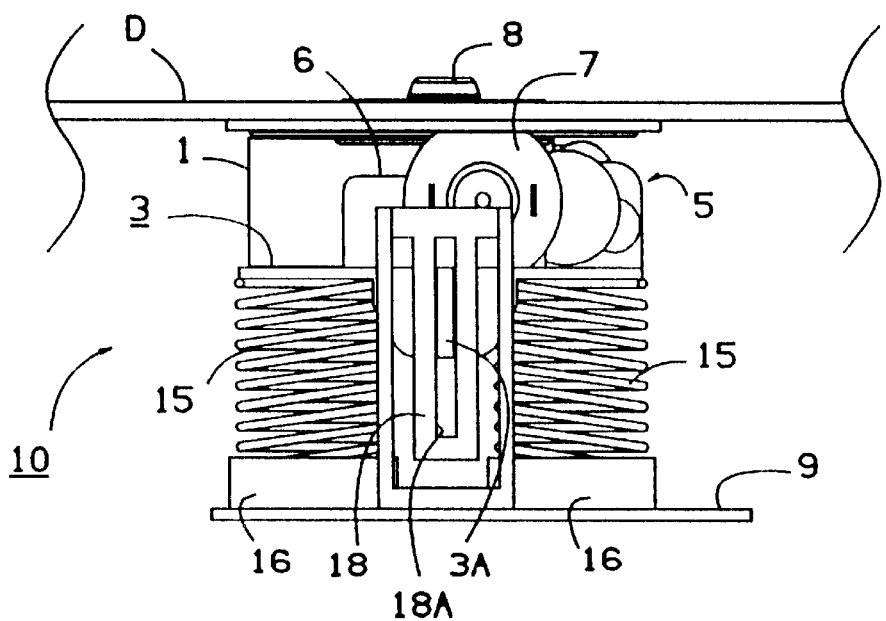
FIG. 2 is a side-view drawing of the optical mechanism of FIG. 1.

Referring to FIG. 1 and FIG. 2, a base 3 of optical mechanism 10 is rectangular. A turntable 8, an optical pickup 1, a threaded motor 7, and the like are disposed on the upper surface of base 3. Note that the length along the shorter axis of base 3 is roughly the same as the diameter of turntable 8.

Base 3 is attached to a moving base 9 via four vibration-preventing members 15 that prevent external vibrations from being transferred to base 3. Resilient vibration-preventing members 15, which may include coil springs and dampers (not shown in the drawings), are fixed to a foundation 16. Vibration-preventing members 15 are disposed at equal intervals on an arc centered on the output shaft 12 of a spindle motor 6.

Output shaft 12 of spindle motor 6 is attached to turntable 8. Spindle motor 6 rotates a disk D mounted on turntable 8 at a prescribed speed.

A feed screw 2 is attached to base 3, in a direction parallel to the longer side of base 3. Feed screw 2 drives optical pickup 1. Feed screw 2 is rotatably supported on both ends by bearings attached to base 3. Feed screw 2 is connected to threaded motor 7 via means for transferring power 5.

Figure 11:
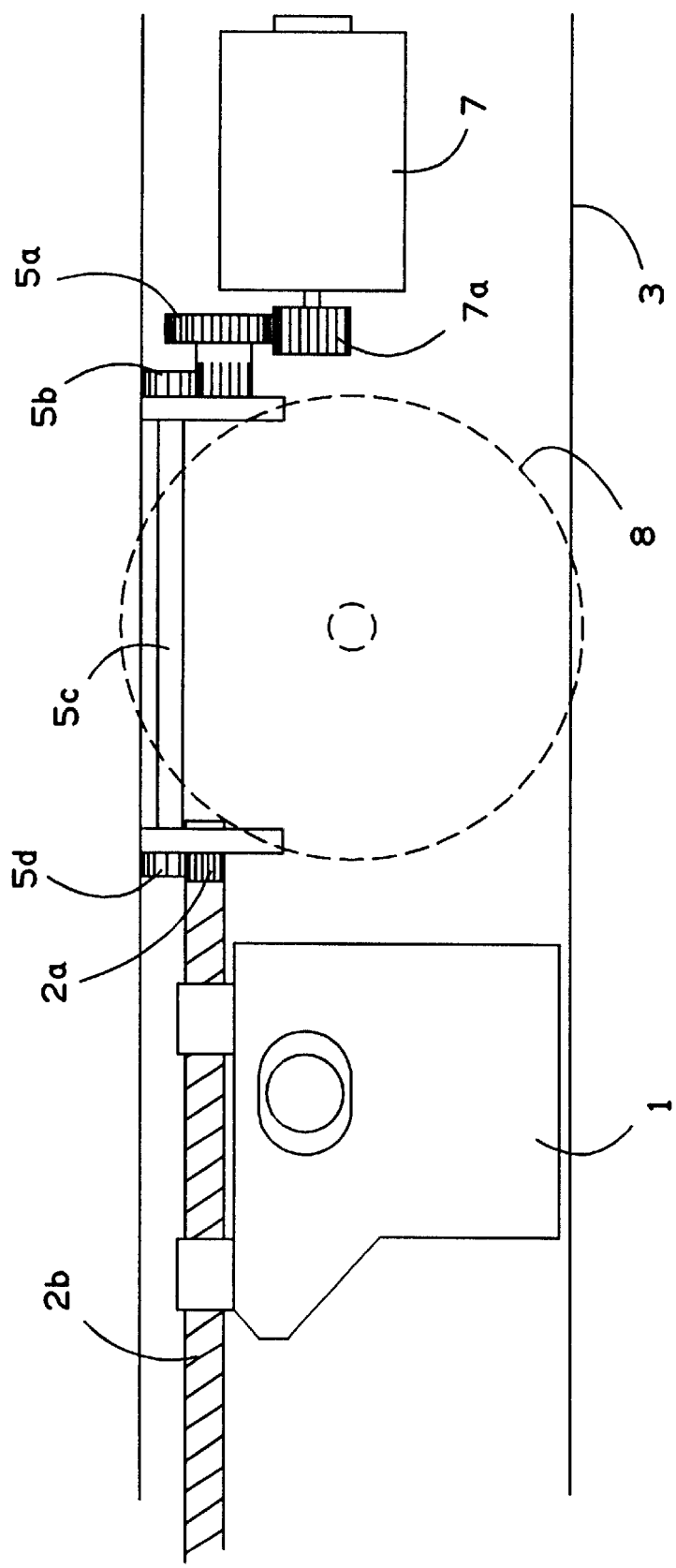
FIG. 11 is a detail of the threaded motor shown in FIG. 1 and FIG. 2.

As shown in FIG. 11, threaded motor 7 transmits power to means for transferring power 5 via gear 7a. The rotation of gear 7a couples power to shaft 5c through gears 5a and 5b. Shaft 5c rotates gear 5d coupling power to gear 2a which is connected to feed screw 2. As feed screw 2 rotates, power is coupled to optical pickup 1.

Referring now to FIGS. 1, 2 and 11, optical pickup 1 has a threaded section (not shown) threaded onto feed screw 2. The rotation of feed screw 2 moves optical pickup 1 between the inner perimeter and the outer perimeter of disk D. On a side of optical pickup 1 opposite the threaded section, an engagement section engages a slit (not shown in the drawing) formed on base 3. Engagement of optical pickup 1 with the slit and feed screw 2 displaces optical pickup 1 in the direction of feed screw 2.

Spindle motor 6 is disposed beneath turntable 8, with the output shaft 12 of spindle motor 6 aligned coaxial with turntable 8. Optical pickup 1 is disposed to the left of turntable 8. Threaded motor 7 is disposed to the right of turntable 8 to drive turntable 8. Vibration-preventing members 15 are disposed at equal intervals along an arc centered on output shaft 12 of spindle motor 6. The positioning of optical pickup 1 and threaded motor 7 at opposing symmetrical positions relative to the center of turntable 8 prevents the load from concentrating unevenly on the vibration-prevention members 15.

Referring to the plan drawing in FIG. 1, power transferring means 5 passes below turntable 8. Power transferring means 5 transfers power from threaded motor 7 to optical pickup 1. Positioning this linkage in the space under turntable 8 keeps the length of the shorter side of optical mechanism 10 at or below the size of turntable 8.

Figure 3:
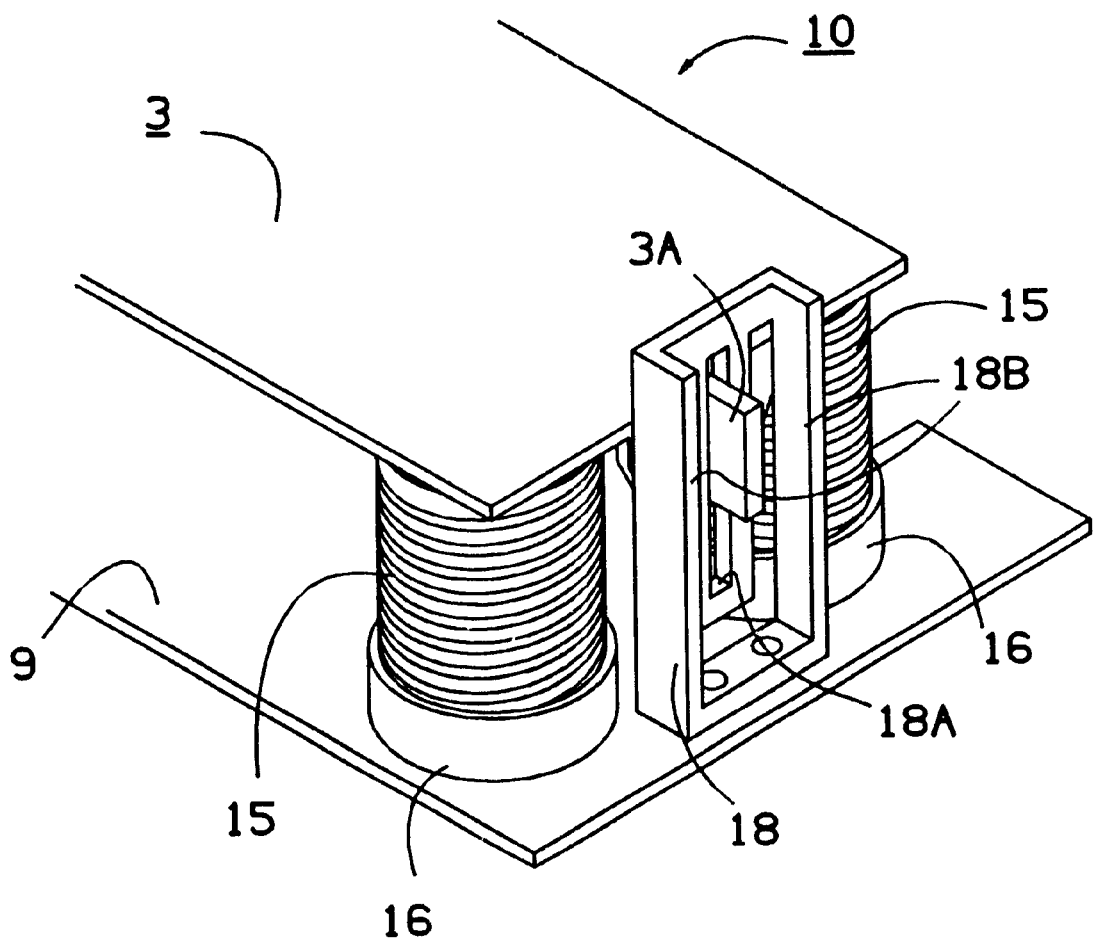
FIG. 3 is a drawing showing the engaging member of FIGS. 1 and 2 are engaged.
Figure 4:
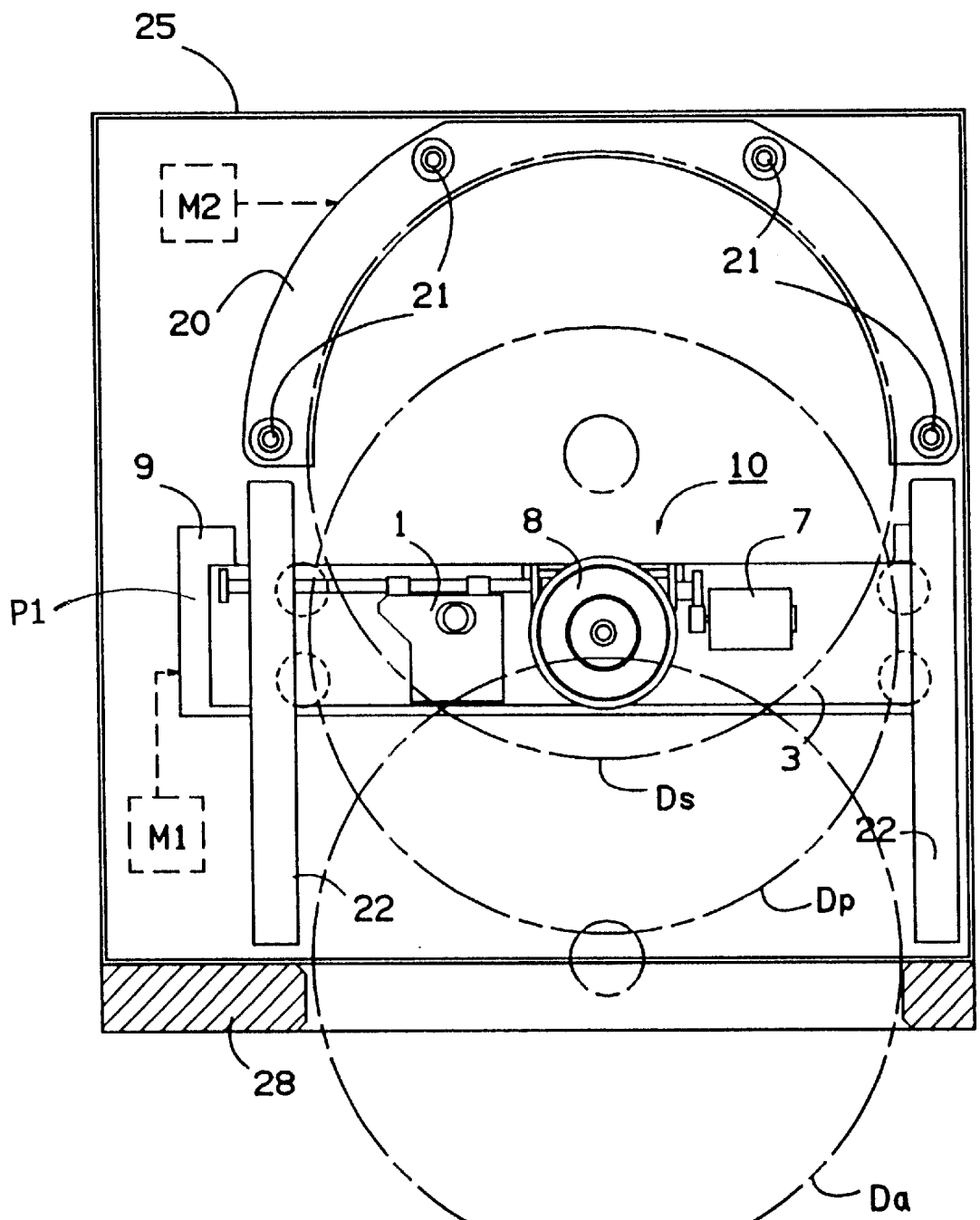
FIG. 4 is a plan drawing of the changer of FIG. 1 with the optical mechanism in a playback position.
Figure 5:
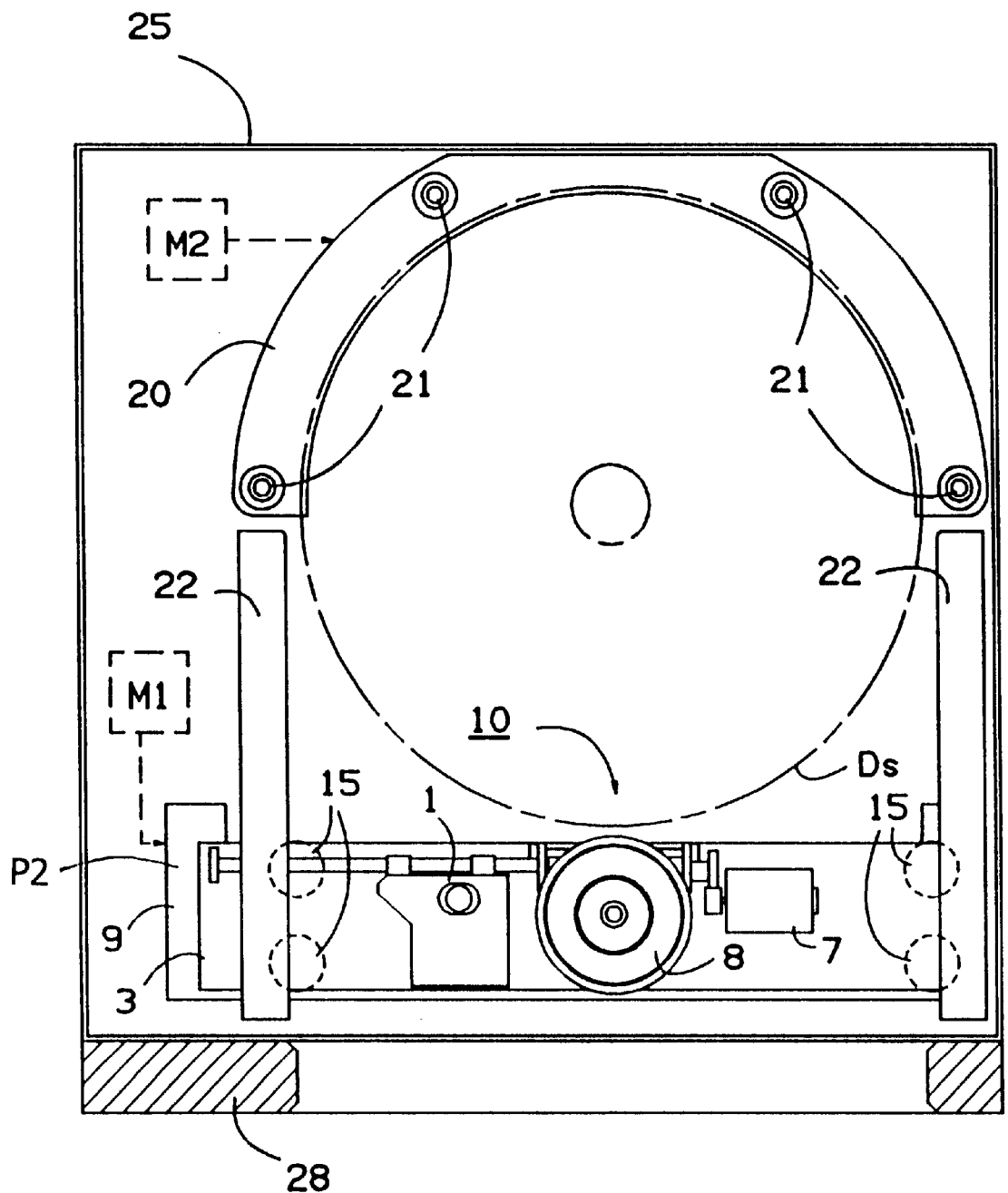
FIG. 5 is a plan drawing of the changer of FIG. 1 with the optical mechanism in a recessed position.

Engagement sections 3A are formed on opposing left and right ends of base 3. Engagement sections 3A engage restricting members 18. Referring to FIG. 3, restricting member 18 includes a slit 18A (guiding means) that allows vertical movement of base 3 by moving mechanism M1. Engagement section 3A projects from the side surface of base 3 and is inserted into slit 18A. Restricting member 18 does not restrict vertical movement of base 3. However, movement in the direction of the shorter side of optical mechanism 10 is elastically restricted by elastic section 18B.

Vibration-prevention members 15 provide adequate vibration absorption since base 3 is free to move in a vertical direction. No load is applied to restricting member 18 even when base 3 is moved down and the damper is locked. Restricting member 18 thus makes it possible to provide effective restriction of sloping along the shorter side of optical mechanism 10 only.

When optical mechanism 10, according to this embodiment, is used in a changer-type disk playback device, sloping of optical mechanism 10 along the shorter side of optical mechanism 10 is prevented. By preventing the sloping of the optical mechanism 10, a disk mounted on the turntable is prevented from coming into contact with any stored disks. The stored disk and the disk mounted on the turntable are assured more reliable operation without damaging the disks. Because the disk in the playback position is prevented from coming close to the stored disks, the number of disks stored in the changer is increased, and the clearance between the playback disk and the stored disks is reduced.

When the present invention is used in a non-changer type disk playback device, the disk mounted on the turntable is effectively prevented from sloping. By preventing the sloping of the disk on the turntable the height of the disk playback device is reduced while still providing vibrational damping.

In the preferred embodiment, restricting members 18 are disposed at the left and right ends of base 3. The restricting members 18 restrict the sloping of optical mechanism 10 toward the short side of optical mechanism 10 by using a slit 18A mating with an engagement section 3A.

Figure 9:
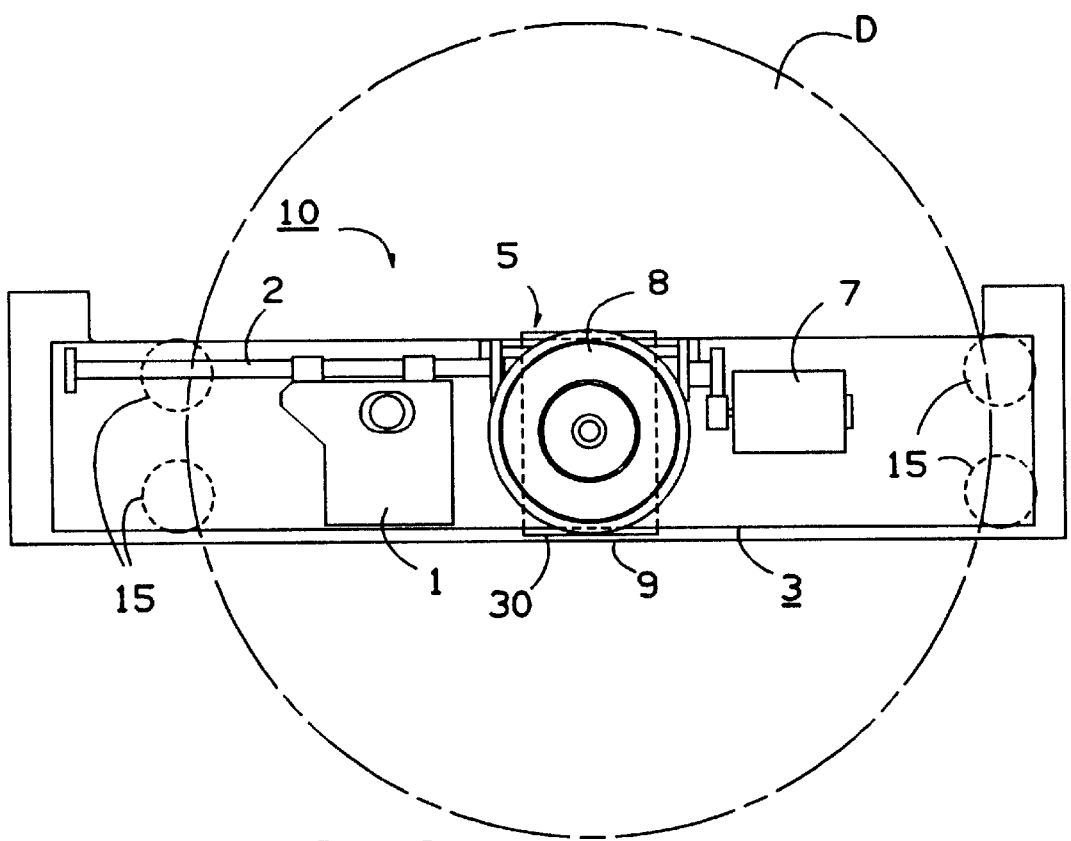
FIG. 9 is a plan drawing showing a further embodiment of the restricting member according to the invention.
Figure 10:
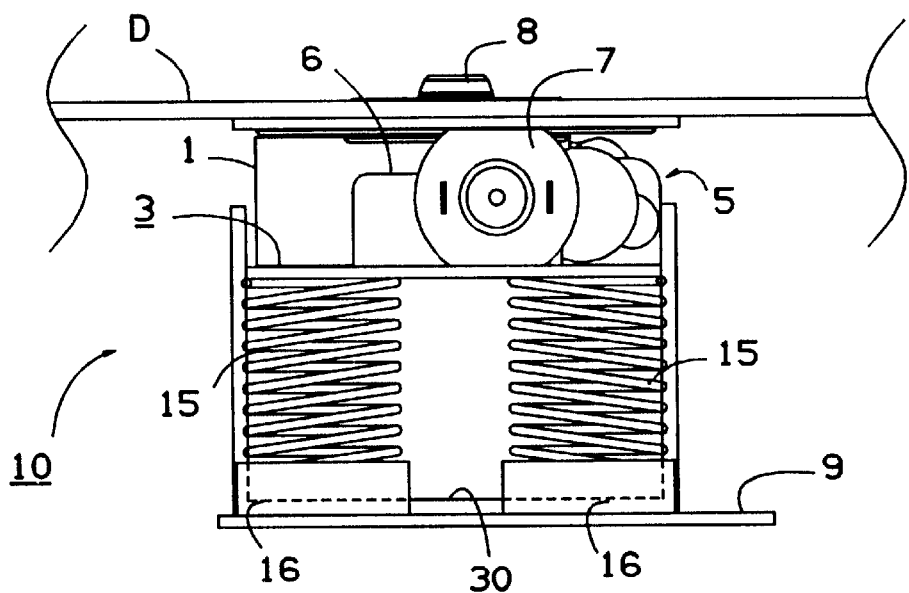
FIG. 10 is a side-view drawing of the device in FIG. 9.

Referring to FIG. 9 and FIG. 10, it is noted that the present invention is not limited to a vertical shaped slit to prevent sloping of optical mechanism 10. For example, a C-shaped plate spring 30 can substitute for the restricting member 18A and the engagement section 3A. The vertical portions of C-shaped plate spring 30 restrict transverse motion of base 3, and thereby restrict sloping of optical mechanism 10 toward the short side of optical mechanism 10.

In the present invention, a restricting member prevents an optical mechanism from sloping in the direction most likely to be affected by external vibrations. This prevents a disk mounted on a turntable from coming into contact with stored disks and mechanisms around the disks. Thus, the device is made more compact and the changer can hold more disks without requiring extra vertical clearance for the disk mounted on the turntable.

Although the above preferred embodiment only discusses a disk playback device, it is understood by one of ordinary skill in the art that a disk recording device is well within the scope of this invention. It is also understood that although only optical disk reading is discussed above, reading any other type of disk, including but not limited to: magnetic disks, CD-ROM disks, DVD-ROM disks and the like, are well within the scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk playback device comprising:
   a turntable for mounting a disk thereon;
   an optical pickup movable along a radius of said disk for optically reading information recorded on said disk when said disk is mounted on said turntable;
   a base extending along a direction of motion of said optical pickup wherein said base comprises an engagement section disposed along an edge of said base and;
   said turntable and said optical pickup being disposed on said base;
   a vibration-preventing member elastically supporting said base; and
   a restricting means comprising:
      a guiding means wherein said engagement section being slidably engaged in said means, said guiding means allowing a vertical movement of said base and said guiding means preventing a sloping of said base along a short side of said base.

2. A disk playback device as recited in claim 1, further comprising:
   a moving mechanism for moving said base between a mount position, where said disk is mounted on said turntable, and a recessed position, where said turntable is recessed; and
   said restricting means includes guiding means allowing said moving mechanism to move said base.

3. A disk playback device comprising:
   a turntable for mounting a disk thereon;
   an optical pickup movable along a radius of said disk for optically reading information recorded on said disk when said disk is mounted on said turntable;
   a base extending along a direction of motion of said optical pickup wherein said base comprises an engagement section disposed along an edge of said base and;
   said turntable and said optical pickup being disposed on said base;
   a plurality of vibration-preventing members elastically supporting said base; and
   a restriction means comprising:
      a guiding means wherein said engagement section being slidably engaged in said means, said guiding means allowing a vertical movement of said base and said guiding means preventing a sloping of said base along a direction in which a distance between said vibration-preventing members is smaller.

4. A disk playback device as recited in claim 3, further comprising: a moving mechanism for moving said base between a mount position, where said disk is mounted on said turntable, and a recessed position, where said turntable is recessed; and
   said restricting means includes guiding means allowing said moving mechanism to move said base.

5. A disk playback device comprising:
   a turntable for mounting a disk thereon;
   an optical pickup movable along a radius of said disk for optically reading information recorded on said disk when said disk is mounted on said turntable;
   said turntable and said optical pickup being disposed on a base;
   said base extending along a direction of motion of said optical pickup wherein said base comprises an engagement section disposed along an edge of said base and;
   a vibration-preventing member elastically supporting said base; and
   a restricting means comprising:
      a guiding means wherein said engagement section being slidably engaged in said means, said guiding means allowing a vertical movement of said base and said guiding means preventing sloping by said base along a first direction which is effected by an external vibration.

6. A disk playback device as recited in claim 5, further comprising:
   a moving mechanism for moving said base between a mount position, where said disk is mounted on said turntable, and a recessed position, where said turntable is recessed; and
   said restricting means includes guiding means allowing said moving mechanism to move said base.

7. A device comprising:
   a chassis;
   a base having a first axis and a second axis;
   said first axis being perpendicular to said second axis;
   said base extending along a direction of said first axis wherein said base comprises an engagement section disposed along an edge of said base parallel to said second axis;
   a turntable for mounting a disk thereon;
   said turntable being disposed on said base;
   a vibration-preventing member resiliently supporting said base on said chassis to damp external vibrations and thereby reduce vibrations on said turntable; and
   a restriction means comprising:
      a guiding means wherein said engagement section being slidably engaged in said means, said guiding means allowing a vertical movement of said base and said guiding means preventing a sloping of said base along said second axis.

8. A device as recited in claim 7, further comprising;
   an optical pickup movable along a radius of said disk for reading optically recorded information from said disk mounted on said turntable; and
   said optical pickup is disposed on said base such that said vibration-preventing member reduces the effects of said external vibration on said reading of said disk.

9. A device as recited in claim 7, further comprising:
   a moving mechanism for moving said base between a mount position, where said disk is mounted on said turntable, and a recessed position, where said turntable is recessed; and said restricting means includes guiding means allowing said moving mechanism to move said base.

10. A device as recited in claim 7, further comprising:

an optical pickup movable along a radius of said disk for reading optically recorded information from said disk mounted on said turntable;

said optical pickup is disposed on said base such that said vibration-preventing member reduces the effects of said external vibration on said reading of said disk.

11. A device comprising:

a chassis;

a base having a first axis, a second axis and an engagement section disposed along an edge of said base parallel to said second axis;

said first axis being perpendicular to said second axis;

a turntable for mounting a first disk thereon;

said turntable being disposed on said base;

a holder having a plurality of disks in a storage position;

said holder being disposed on said chassis;

a vibration-preventing member elastically supporting said base on said chassis such that an external vibration effecting said chassis is damped from said turntable; and a restricting means comprising:

a guiding means wherein said engagement section being slidably engaged in said means, said guiding means allowing a vertical movement of said base and said guiding means preventing a sloping of said base along one of said first axis and said second axis such that said restricting means prevents said external vibration from causing said first disk to contact said plurality of disks.

12. A device as recited in claim 11, further comprising:

an optical pickup movable along a radius of said first disk for reading optically recorded information from said first disk mounted on said turntable; and said optical pickup is disposed on said base such that said vibration-preventing member reduces the effects of said external vibration on said reading of said first disk.

13. A device as recited in claim 11, further comprising:

a moving mechanism for moving said base between a mount position, where said first disk is mounted on said turntable, and a recessed position, where said turntable is recessed; and said restricting means includes guiding means allowing said moving mechanism to move said base.

14. A device as recited in claim 11, further comprising:

an optical pickup movable along a radius of said first disk for reading optically recorded information from said first disk mounted on said turntable;

said optical pickup is disposed on said base such that said vibration-preventing member reduces the effects of said external vibration on said reading of said first disk;

a moving mechanism for moving said base between a mount position, where said first disk is mounted on said turntable, and a recessed position, where said turntable is recessed; and and restricting means includes guiding means allowing said moving mechanism to move said base.

* * * * *